United States Patent
Lee

(10) Patent No.: US 8,166,285 B2
(45) Date of Patent: Apr. 24, 2012

(54) METHOD AND SYSTEM FOR BOOTING AND AUTOMATICALLY UPDATING SOFTWARE, AND RECOVERING FROM UPDATE ERROR, AND COMPUTER READABLE RECORDING MEDIUM STORING METHOD

(75) Inventor: Jong-suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1351 days.

(21) Appl. No.: 11/513,057

(22) Filed: Aug. 31, 2006

(65) Prior Publication Data

US 2007/0073978 A1 Mar. 29, 2007

(30) Foreign Application Priority Data

Sep. 27, 2005 (KR) .................. 10-2005-0089692

(51) Int. Cl.
*G06F 1/24* (2006.01)
*G06F 15/177* (2006.01)
*G06F 9/445* (2006.01)

(52) U.S. Cl. .............. 713/1; 713/2; 713/100; 714/1; 714/2; 714/21

(58) Field of Classification Search .......... 713/1, 2, 713/100; 714/1, 2, 21
See application file for complete search history.

(56) References Cited

U.S. PATENT DOCUMENTS

| | | | |
|---|---|---|---|
| 5,557,799 A * | 9/1996 | Welman ............................ | 713/2 |
| 6,175,917 B1 | 1/2001 | Arrow et al. | |
| 6,449,716 B1 * | 9/2002 | Rickey .............................. | 713/2 |
| 6,532,538 B1 * | 3/2003 | Cronk et al. ...................... | 713/2 |
| 6,560,701 B1 * | 5/2003 | Berstis et al. ..................... | 713/2 |
| 6,711,660 B1 | 3/2004 | Milne et al. | |
| 6,792,556 B1 * | 9/2004 | Dennis .............................. | 714/6 |
| 6,862,681 B2 * | 3/2005 | Cheston et al. ................... | 713/2 |
| 7,150,036 B1 * | 12/2006 | Milne et al. ...................... | 726/4 |
| 7,194,659 B2 * | 3/2007 | Buchanan et al. ............. | 714/36 |
| 7,263,589 B2 | 8/2007 | Han et al. | |
| 2003/0014619 A1 | 1/2003 | Cheston et al. | |
| 2003/0051127 A1 | 3/2003 | Miwa | |
| 2004/0078680 A1 * | 4/2004 | Hu et al. ........................ | 714/36 |

(Continued)

FOREIGN PATENT DOCUMENTS

CN 1591359 A 9/2005

(Continued)

OTHER PUBLICATIONS

Chinese Office Action dated Aug. 14, 2009 English Language Translation.

(Continued)

*Primary Examiner* — Kim Huynh
*Assistant Examiner* — Fahmida Rahman
(74) *Attorney, Agent, or Firm* — Sughrue Mion, PLLC

(57) ABSTRACT

Provided are a booting method of updating software components installed in a system and recovering from an error that occurs in an update, a method and system for automatically updating the software and recovering from the error, and a computer readable recording medium storing the method. The master boot record and the backup boot record are used to stably update a kernel and effectively recover from an update error. The component configuration database is used to update a plurality of software components including a kernel in a transaction, and perfectly recover from an update error.

8 Claims, 16 Drawing Sheets

U.S. PATENT DOCUMENTS

| | | |
|---|---|---|
| 2005/0066145 A1 | 3/2005 | Han et al. |
| 2006/0041738 A1* | 2/2006 | Lai .................................. 713/2 |
| 2006/0156057 A1* | 7/2006 | Babu ............................... 714/5 |
| 2007/0067679 A1* | 3/2007 | Deobald ........................ 714/36 |

FOREIGN PATENT DOCUMENTS

| | | |
|---|---|---|
| EP | 0858031 A1 | 8/1998 |
| EP | 1510920 A2 | 3/2005 |
| JP | 2000-315157 A | 11/2000 |
| JP | 2004-38716 A | 2/2004 |
| KR | 10-2002-0065186 A | 8/2002 |
| KR | 2003-0044906 A | 6/2003 |
| KR | 10-2004-0083236 A | 10/2004 |
| KR | 10-2005-0028157 A | 3/2005 |
| WO | 01/80000 A2 | 10/2001 |

OTHER PUBLICATIONS

Notice of Allowance dated Jun. 12, 2007 issued by the Korean Intellectual Property Office for Korean Patent Application No. 10-2005-0089692.

Chinese Office Action issued in copending application No. 200610159300.X on Sep. 15, 2011.

* cited by examiner

METHOD AND SYSTEM FOR BOOTING AND AUTOMATICALLY UPDATING SOFTWARE, AND RECOVERING FROM UPDATE ERROR, AND COMPUTER READABLE RECORDING MEDIUM STORING METHOD

BACKGROUND OF THE INVENTION

This application claims priority from Korean Patent Application No. 10-2005-0089692, filed on Sep. 27, 2005, in the Korean Intellectual Property Office, the disclosure of which is incorporated herein in its entirety by reference.

1. Field of the Invention

Methods and systems consistent with the present invention relate to updating software, and more particularly, to a booting method for updating software components installed in a system and recovering from an error that occurs during the update, a method and system for automatically updating the software and recovering from the error, and a computer readable recording medium storing the method.

2. Description of the Related Art

A kernel is the core of a related art operating system (OS). When an automatic update of a kernel image is stopped due to a system crash, it is impossible to even boot the OS.

FIG. 1 is a block diagram of a boot region of a related art system. Referring to FIG. 1, a current image 110 is a binary image combining an OS and an application. A boot loader 120, which is a code executed to start a system, loads the current image 110 into random access memory (RAM) and executes the loaded image to boot the system. The boot region has a disadvantage in that when an update of the current image 110 fails, it is impossible to automatically recover the failed update. Also, the boot region does not provide functions of updating several software components and recovering.

FIG. 2 is a block diagram of a boot region of another related art system, which automatically updates a kernel using an update validity confirmation repository 230. Referring to FIG. 2, when the kernel is updated, a current image 220 is copied into a backup repository to generate a backup image 210, and a new image 220 is downloaded. If there is any trouble with the booting of the system, a boot loader 240 checks an update validity based on the update validity confirmation repository 230 and copies the backup image 210 into the new image 220 to reboot the system. This related art system has a disadvantage in that the entire backup image 210 is copied to recover the system. Therefore, the related art system is not efficient, since it usually takes about 20 to 30 seconds to copy a kernel image of 12 Mbytes (megabytes) in a flash memory.

FIG. 3 is a block diagram of a boot region of another related art system, which automatically updates a kernel using two boot loaders 330 and 340. Referring to FIG. 3, when the kernel is updated, a current image 320 is copied to a backup repository to generate a backup image 310, and a new image 320 is downloaded. If there is any trouble with the booting when a first boot loader 340 is executed, a second boot loader 330 is executed to load the backup image 310. This related art system has a disadvantage in that the system should have a function of physically executing two boot loaders 330 and 340.

Accordingly, a technology for automatically updating the kernel and effectively recovering the system when an update error occurs is required. Also, the technology must perform an update rollback when an error occurs in updating several software components, including the kernel. More specifically, the technology must automatically recover the software to its previous state (e.g., to a last rebooting point) when the update error occurs, in order to provide reliability of a software automatic update.

SUMMARY OF THE INVENTION

The present invention provides a booting method of updating software components including a kernel and automatically recovering from an error occurred in the update, a method and system for automatically updating the software and recovering from the error, and a computer readable recording medium storing the method.

According to another aspect of the present invention, there is provided a method of booting a system by loading a kernel, the method comprising: determining whether a master boot record including information on the kernel is valid; if it is determined that the master boot record is valid, loading and executing the kernel using the master boot record; and if it is determined that the master boot record is not valid, loading and executing a previous kernel using a backup boot record including information on the previous kernel.

The method may further comprise: determining a previous update result based on component configuration information including information on the update of software components installed in the system; if it is determined that the previous update was successfully finished, loading and executing the components based on current component information included in the component configuration information; and if it is determined that the previous update was stopped, loading and executing the components based on previous component information included in the component configuration information.

The method may further comprise: when the previous update was stopped, if it is determined that the update of components other than the kernel was completed, and current kernel information included in the component configuration information and kernel information stored in the master boot record are identical to each other, loading and executing the components based on the current component information included in the component configuration information.

According to another aspect of the present invention, there is provided a method of automatically updating software for updating a kernel and recovering from an update error, the method comprising: downloading the kernel of a new version and storing the downloaded kernel; copying a master boot record including information on the kernel on a backup boot record; and recording information on the kernel of the new version on the master boot record.

According to another aspect of the present invention, there is provided a method of automatically updating software and recovering from an update error to update a kernel, the method comprising: starting an update transaction; changing state information on the kernel to "download", changing previous information on the kernel to current information, downloading a kernel of a new version, and storing the downloaded kernel; changing state information on the kernel to "update", copying information on a master boot record that includes information on a kernel to a backup boot record, and recording information on the kernel of the new version in the current information on the kernel and the master boot record; changing the state information on the kernel to "done", and finishing the update transaction.

The method may further comprise: before recording new information on the master boot record, indicating a validity flag of the master boot record as "invalid", and, after recording the new information on the master boot record, indicating the validity flag of the master boot record as "valid".

According to one aspect of the present invention, there is provided a method of automatically updating software for automatically recovering a kernel having an update error and recovering from the update error, the method comprising: determining whether an update of the kernel is stopped; and if it is determined that the update is stopped, copying a backup boot record to a master boot record.

The determining may further comprise: if a transaction of the update is started, determining that the update is stopped.

The determining may further comprise: if current information on the kernel is identical to information on the kernel included in the master boot record, determining that the update is successfully finished.

According to another aspect of the present invention, there is provided a method of automatically updating software for updating more than one software components whose update is necessary and recovering from an update error, the method comprising: sequentially updating the components, other than a kernel, included in an update package including a list of the components whose update is necessary; and if the update package includes the kernel, updating the kernel last.

The updating of the components may further comprise: changing previous information on the components to current information on the components, and downloading a component of a new version; and changing the current information on the components to information on the component of the new version.

The method may further comprise: before updating the components other than the kernel, starting an update transaction; and after updating the kernel, finishing the update transaction.

The updating of the kernel may further comprise: changing state information on the kernel to "download", changing previous information on the kernel to current information, downloading a kernel of a new version, and storing the downloaded kernel; changing state information on the kernel to "update", copying a master boot record that includes information on the current kernel to a backup boot record, and recording information on the kernel of the new version in the current information on the kernel and the master boot record; and changing the state information on the kernel to "done".

According to another aspect of the present invention, there is provided a method of automatically updating software for recovering software components having an update error and recovering from the update error, the method comprising: determining whether an update of the components included in an update package is stopped; and if it is determined that the update is stopped, converting backup components of the components included in the update package into original components.

The converting of the backup components may further comprise: if the component is a kernel, copying a backup boot record to a master boot record.

According to another aspect of the present invention, there is provided a system for automatically updating software and recovering from an update error, the system comprising; a non-volatile memory storing a current kernel, a master boot record including address information on the current kernel, and a boot loader that loads the current kernel to the RAM and executes the RAM using the master boot record to boot the system; and a processor executing the boot loader stored in the non-volatile memory.

The master boot record may further comprise a validity flag indicating whether the current kernel is valid, the non-volatile memory further comprises a previous kernel and a backup boot record that includes address information on the previous kernel, and if it is determined that the master boot record is valid, the boot loader loads the current kernel using information on the master boot record, and if it is determined that the master boot record is not valid, loading the previous kernel using information on the back boot record.

The non-volatile memory may further comprise component configuration information that includes information on a software update, and an update engine that updates software components and recovers from an error occurred in the components update using the component configuration information.

The component configuration information may include state information on an update transaction, previous information including names, addresses, and version of previous components, current information including addresses and version of current components, and update state information on the components, and the update engine updates each of the components and recovers from the update error based on the component configuration information.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention will be described in detail with reference the accompanying drawings.

Figure 1:
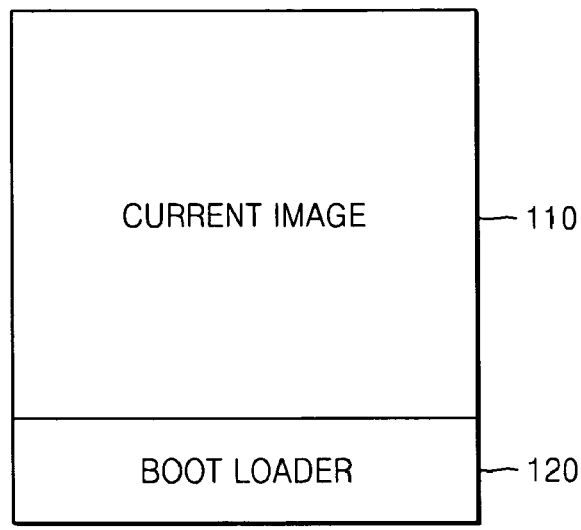
FIG. 1 is a block diagram of a boot region of a related art system.
Figure 2:
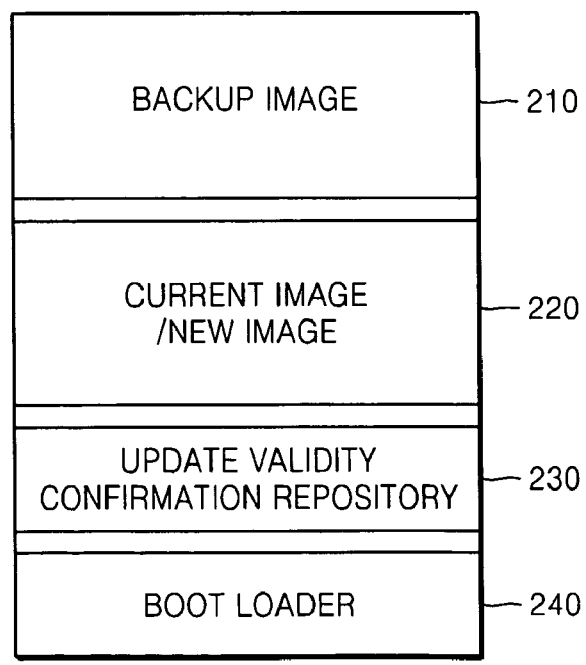
FIG. 2 is a block diagram of a boot region of another related art system, which automatically updates a kernel using an update validity confirmation repository.
Figure 3:
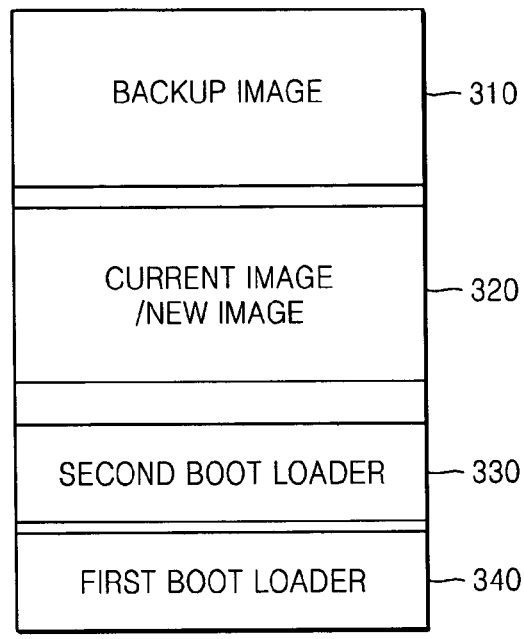
FIG. 3 is a block diagram of a boot region of another related art system, which automatically updates a kernel using two boot loaders.
Figure 4A:
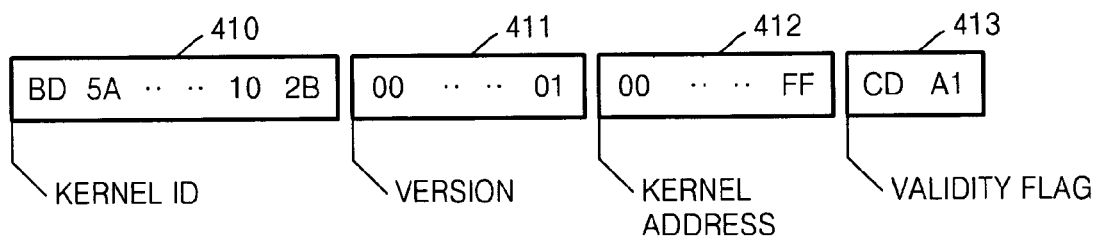
FIG. 4A illustrates an example of a boot record according to an exemplary embodiment of the present invention.

FIG. 4A illustrates an example of a boot record according to an exemplary embodiment of the present invention. A boot loader loads a kernel and executes the loaded kernel by using the boot record when a system starts.

The boot record comprises a kernel address 412 and a validity flag 413. The kernel address 412 indicates where the kernel stored in a flash memory is located. A boot loader finds the kernel using the kernel address 412 and loads the kernel. The validity flag 413 indicates whether the kernel is valid or not. That is, information in the boot record is corrected when the kernel is updated. Before the boot record is corrected, the validity flag 413 is set to indicate that the kernel is invalid, and after the boot record is corrected, the validity flag 413 is set to indicate that the kernel is valid, thereby allowing accurate determination of whether the information in the boot record is valid. Also, a kernel identifier (ID) 410 and a version 411 can be included in the boot record.

The exemplary embodiment includes two boot records. One of them is a master boot record that stores information on a current kernel, and the other is a backup boot record that includes information on a previous kernel that was successfully loaded.

Figure 4B:
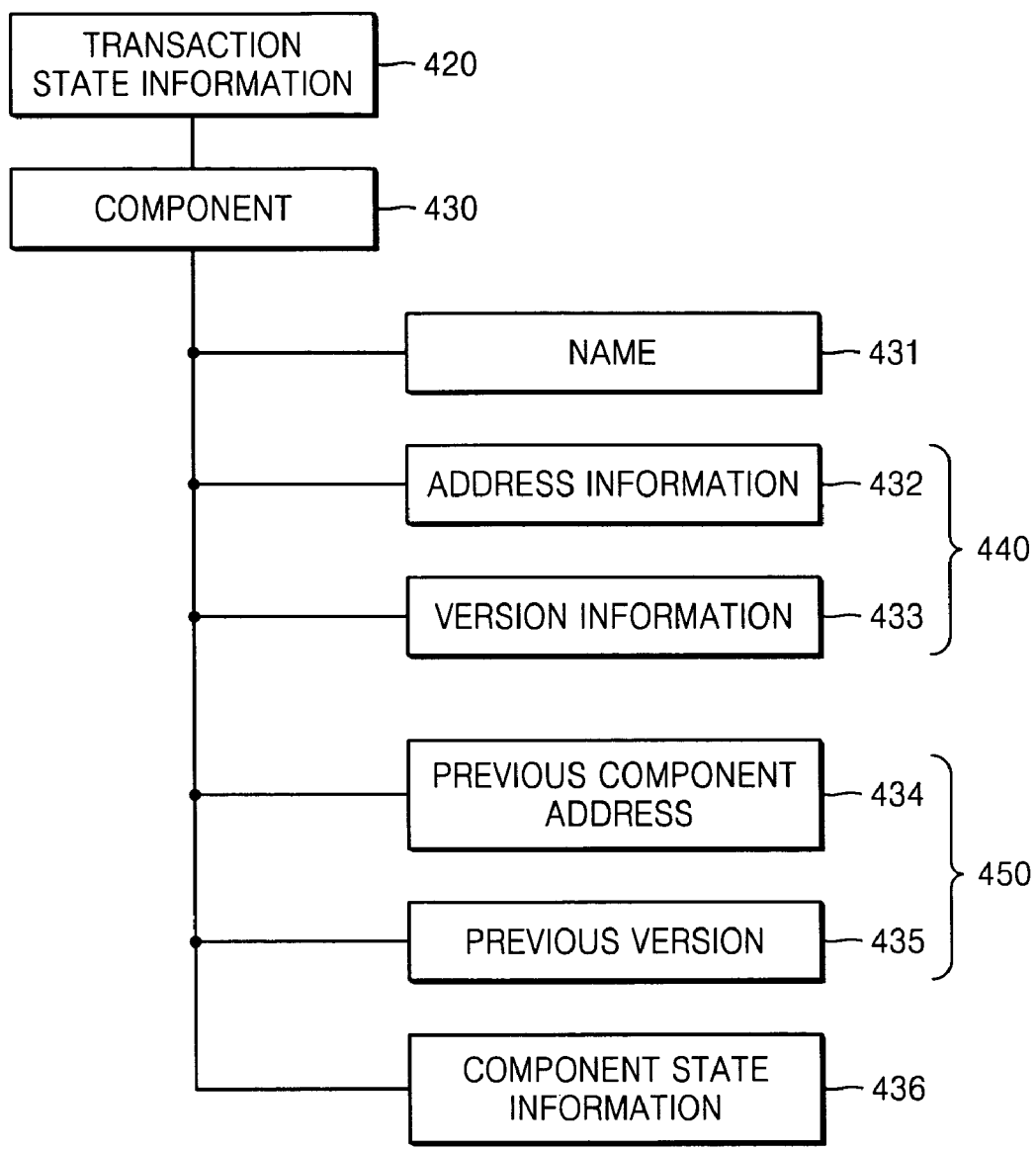
FIG. 4B is a block diagram of component configuration information according to an exemplary embodiment of the present invention.

FIG. 4B is a block diagram of component configuration information according to an exemplary embodiment of the present invention. Referring to FIG. 4B, the component configuration information includes basic information on software components installed in a system and update information. The component configuration information can be realized in a database (DB).

Transaction state information 420 is used to manage an update transaction and is a flag used to store a current state of the update transaction and determine whether the update succeeds or not.

The component configuration information contains information on each component 430. For example, but not by way of limitation, the information comprises a name 431, current component information 440 including address information 432 and version information 433, previous component information 450 for managing a previous component address 434 and a previous version 435 before the current component is updated, and component state information 436 for managing a state of the component update. The exemplary embodiment automatically recovers the system using the component state information 436.

Figure 5:
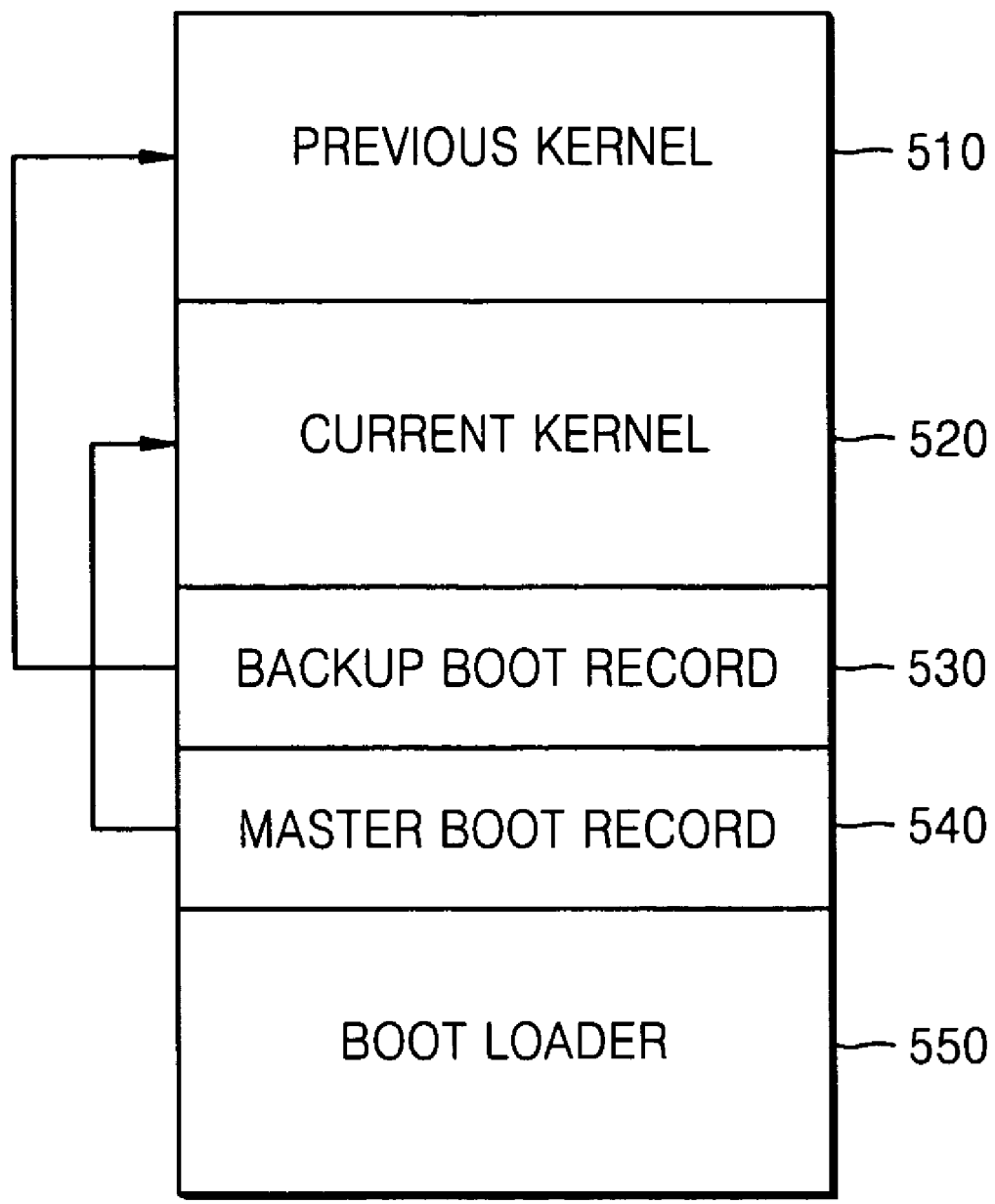
FIG. 5 is a block diagram of a boot region according to an exemplary embodiment of the present invention.

FIG. 5 is a block diagram of a boot region according to an exemplary embodiment of the present invention. Referring to FIG. 5, the boot region comprises a boot loader 550, a current kernel 520, a backup previous kernel 510, a master boot record 540 in which information on the current kernel 520 is recorded, and a backup boot record 530 in which information on the previous kernel 510 is recorded.

Figure 6:
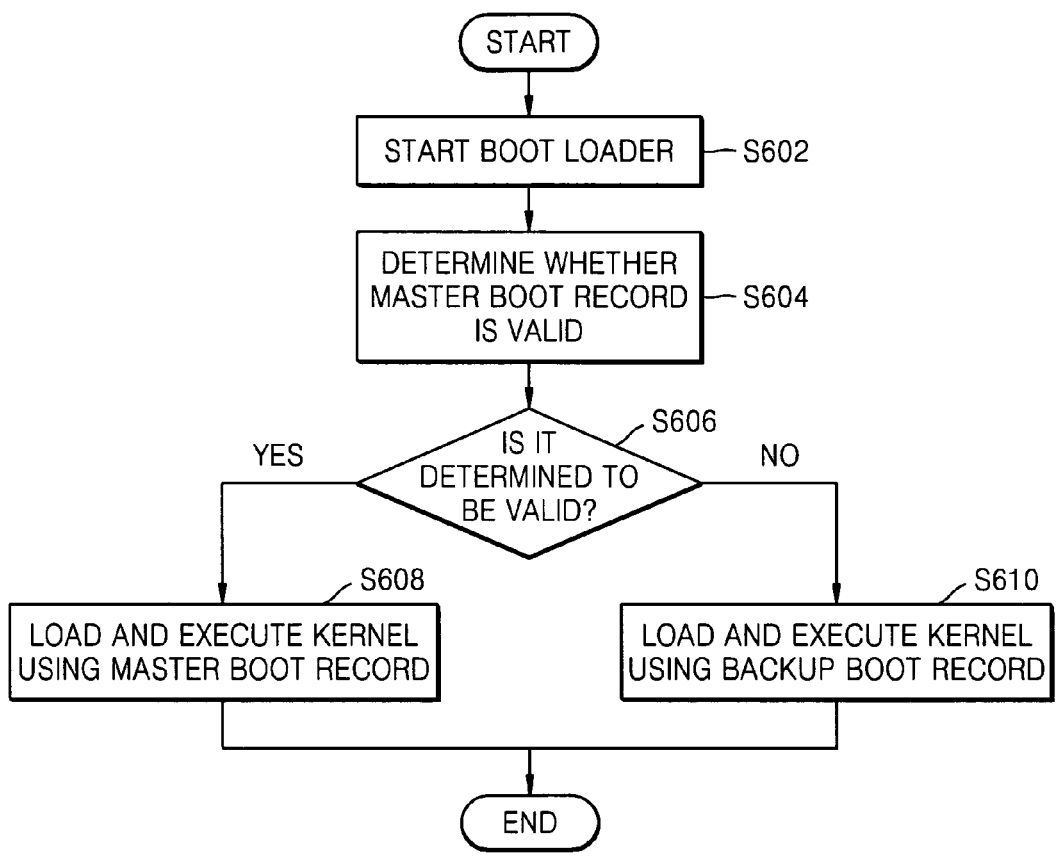
FIG. 6 is a flowchart illustrating a mechanism of loading a kernel using the boot region illustrated in FIG. 5.

FIG. 6 is a flowchart illustrating a mechanism of loading a kernel using the boot region illustrated in FIG. 5. Referring to FIG. 6, the boot loader 550 is started (Operation S602) to determine whether a validity flag of the master boot record 540 is valid or not (Operation S604). If it is determined that the validity flag of the master boot record 540 is valid (Operation S606), the kernel is loaded and executed using the master boot record 540 (Operation S608). That is, the current kernel 520 indicated by the master boot record 540 is loaded. However, if it is determined that the validity flag of the master boot record 540 is not valid (Operation S606), which indicates an error occurs during a previous update of kernel, the previous kernel 510 is loaded and executed using the backup boot record 530 (Operation S610) to stably start the system.

Figure 7:
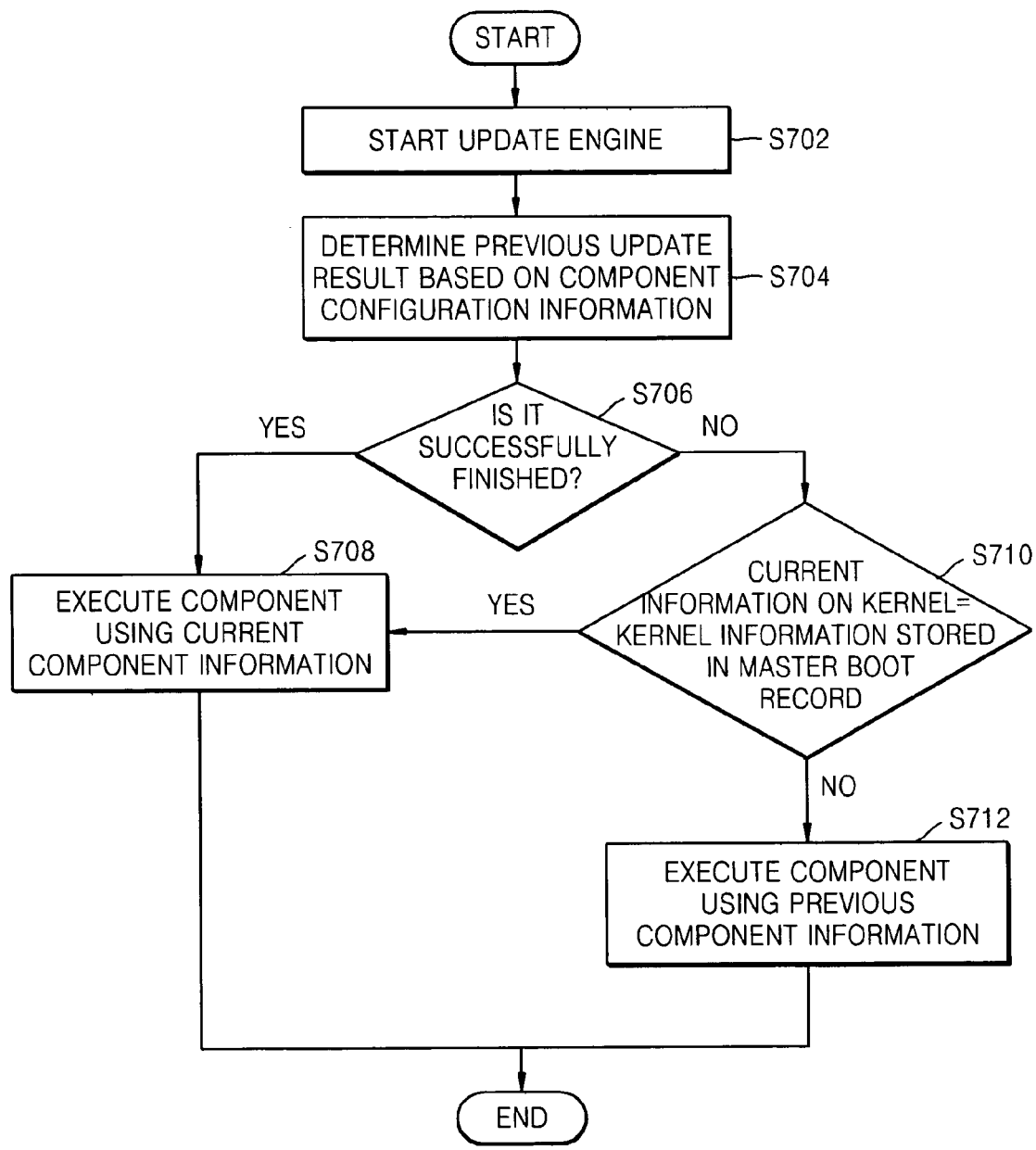
FIG. 7 is a flowchart illustrating an operation of loading other software components after the kernel is completely loaded.

FIG. 7 is a flowchart illustrating an operation of loading other software components after the kernel is completely loaded. Referring to FIG. 7, an update engine program loads and executes the software components used in a system. An update engine is started (Operation S702) to determine whether a previous update is successfully finished based on component configuration information (Operation S704). The determination is based on transaction state information of the component configuration information. If the transaction state information indicates that a transaction has ended, an update transaction is characterized as successfully finished. If the transaction state information indicates that the transaction has started, the update transaction is characterized as unsuccessfully stopped.

If it is determined that the previous update is successfully finished (Operation S706), the software components are loaded and executed using current component information included in the component configuration information (Operation S708). That is, the current versions of software components are loaded based on current component address information.

However, if it is determined that the previous update is stopped (Operation S706), the software components are loaded and executed using previous component information included in the component configuration information (Operation S712). That is, the software components of a previous version are loaded based on previous component address information.

According to an exemplary embodiment of the present invention, the kernel may be updated after all applications other than the kernel are updated. Therefore, although the previous update is stopped, it may be determined that an update of the software components other than the kernel is successfully finished, and current kernel information included in the component configuration information is the same as kernel information of the master boot record (Operation S710). This means that the kernel update is stopped after information on the master boot record is successfully corrected. In this case, since it may be determined that an update transaction is successfully finished even if the transaction has not been committed, it is efficient to load and execute the software components using the current component information included in the component configuration information (Operation S708).

Even if the update of several components is stopped before the system is rebooted, the system can be recovered to a configuration of components last used by a user.

Figure 8:
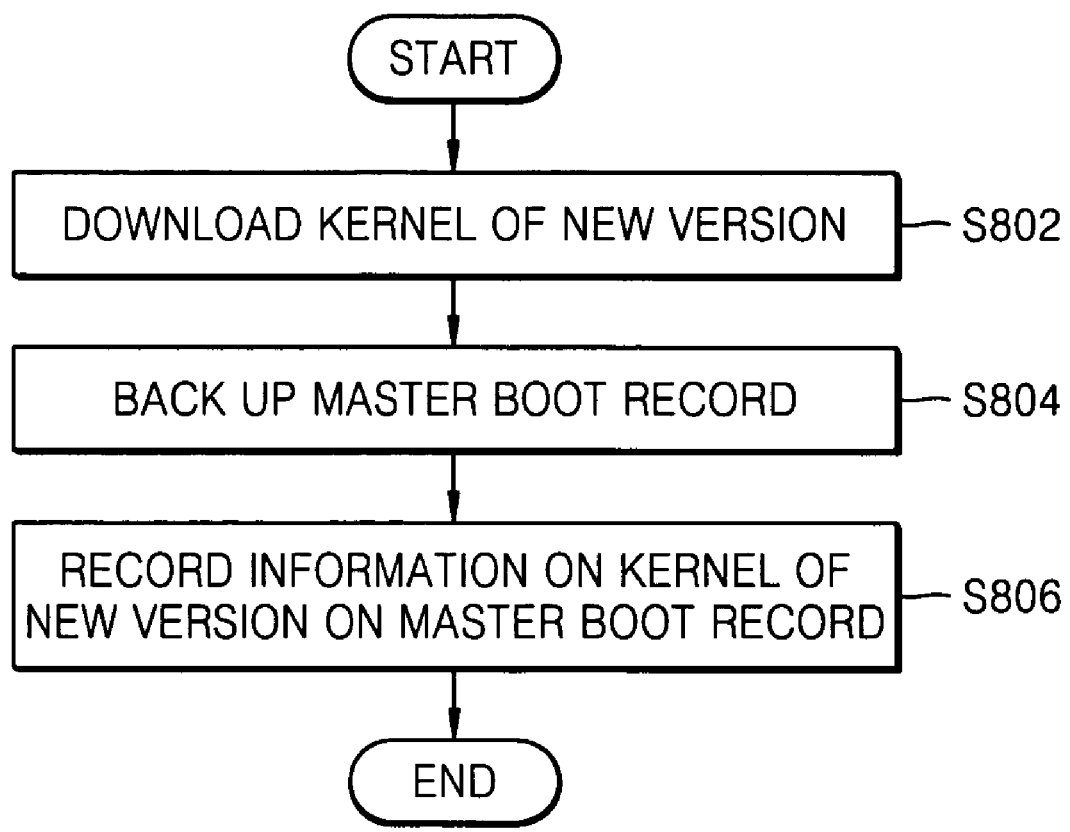
FIG. 8 is a flowchart illustrating a mechanism of automatically updating a kernel according to an exemplary embodiment of the present invention.

FIG. 8 is a flowchart illustrating a mechanism of automatically updating a kernel according to an exemplary embodiment of the present invention. Referring to FIG. 8, the kernel is updated by downloading the kernel of a new version (Operation S802), backing up a master boot record including information on the kernel in a backup boot record (Operation S804), and recording information (e.g., address, etc., but not limited thereto) on the kernel of the new version to the master boot record (Operation S806).

Figure 9A:
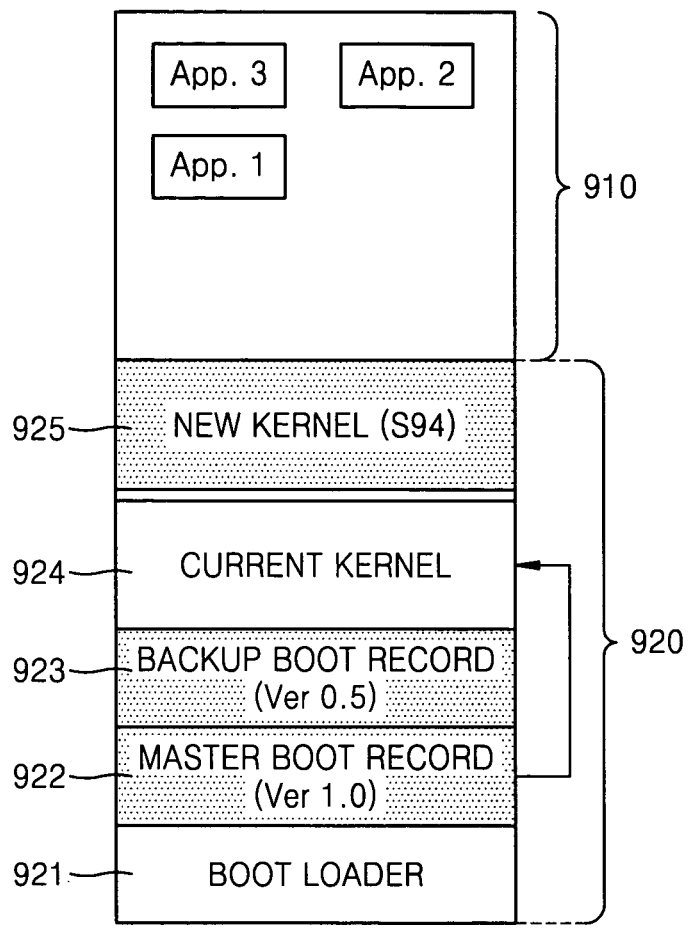
FIGS. 9A, 9B, and 9C in detail illustrate memory state changes during the automatic kernel update according to an exemplary embodiment of the present invention.
Figure 9B:
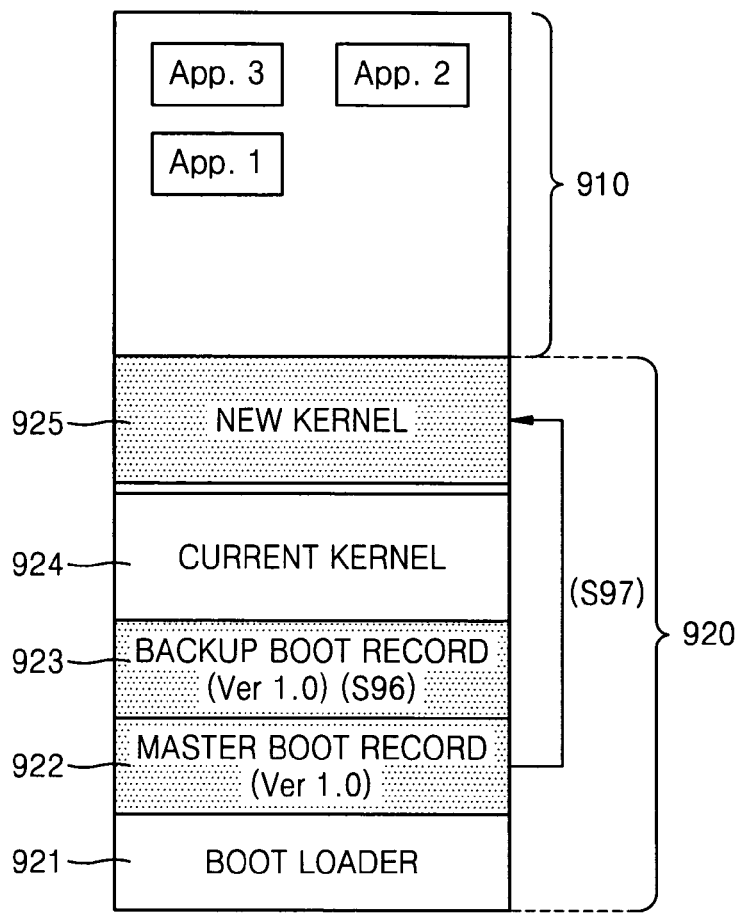
Figure 9C:
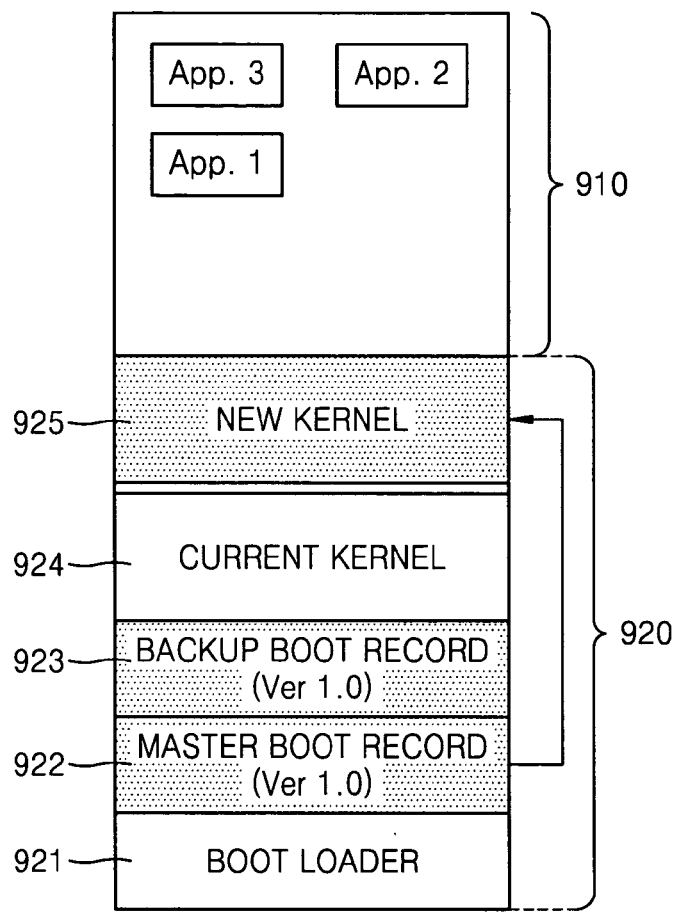

FIGS. 9A, 9B, and 9C illustrate in detail memory state changes during the automatic kernel update according to an exemplary embodiment of the present invention. Referring to FIGS. 9A, 9B, and 9C, a file system region 910 stores three applications App. 1, App. 2, and App. 3, and a raw format region 920 has the substantially same constitution as the boot region illustrated in FIG. 5. A configuration DB 930 that stores component configuration information necessary for the update and recovery contains PACKAGECOMMIT 940, which is transaction state information, component identifiers 950, current version information 960, component state information 970, and previous version information 980. Although not shown in FIGS. 9A, 9B, and 9C, the current address information 423 and the previous address information 435 illustrated in FIG. 4B are updated when the version information is updated.

The raw format region 920, which is a boot area excluding a file system, stores a boot loader 921. However, if the boot loader 921 includes the file system, a kernel and a boot record may be stored in the file system region 910. Also, since the file system region 910 stores the file system like a disk operation system (DOS), the exemplary embodiment does not require such a file system.

If the exemplary embodiment does not have a file system, applications can be stored in the raw format region 920. Also, the configuration DB 930 may be stored in one of the raw format region 920 and the file system region 910.

Referring to FIG. 9A, PACKAGECOMMIT 940 is set as "NO" (Operation S91), which means that the update transaction is started and not yet committed. The state information 970 of the kernel to be updated is changed to "DOWNLOAD" (S92), previous version information 980 is changed to "1.0" corresponding to the current version information 960 (S93), and a new kernel 925 of a new version (1.1) is downloaded and stored (S94). The master boot record 922 indicates a current version 1.0 kernel 924, whereas the backup boot record 923 includes information on a previous version 0.5 backup kernel.

Referring to FIG. 9B, kernel state information is changed to "UPDATE" (S95), information on the master boot record 922 is copied to the backup boot record 923, and information on the kernel of the new version is recorded in current kernel information and the master boot record 922. More specifically, the master boot record 922 indicates a newly downloaded version 1.1 kernel 925 (S97), and the corresponding current version and address of the configuration DB 930 are accordingly changed.

Referring to FIG. 9C, the kernel state information is changed to "DONE" (S98) to indicate that the kernel is successfully updated. Finally, PACKAGECOMMIT 940 is set as "YES" (S99) to indicate that the update transaction has been successfully finished.

In the above process, the validity flag of the master boot record 922 is always indicated "invalid" before new information is recorded on the master boot record 922, and the validity flag of the master boot record 922 is always indicated "valid" after new information is recorded on the master boot record 922.

When an error occurs in the kernel update, the system can be automatically recovered to the kernel of a successfully loaded version by determining whether the kernel update is successfully finished, and, if it is determined that the kernel update is stopped, copying the backup boot record 923 to the master boot record 922.

Whether the kernel update is stopped is determined based on PACKAGECOMMIT 940. In detail, when the system is booted, if PACKAGECOMMIT 940 is set as "NO", it is determined that the update transaction has been stopped.

However, even if the update transaction fails, the current kernel information and the kernel information stored in the master boot record 922 may be substantially identical to each other, that is, when the update transaction is stopped after S91 through S97 are performed. In this case, it is regarded that the kernel update is successfully finished, and the update transaction may be committed to finish without the automatic recovery process.

FIGS. 10A, 10B, 10C, and 10D illustrate memory state changes during automatically updating the components in an update package 990 according to an exemplary embodiment of the present invention.

Figure 10A:
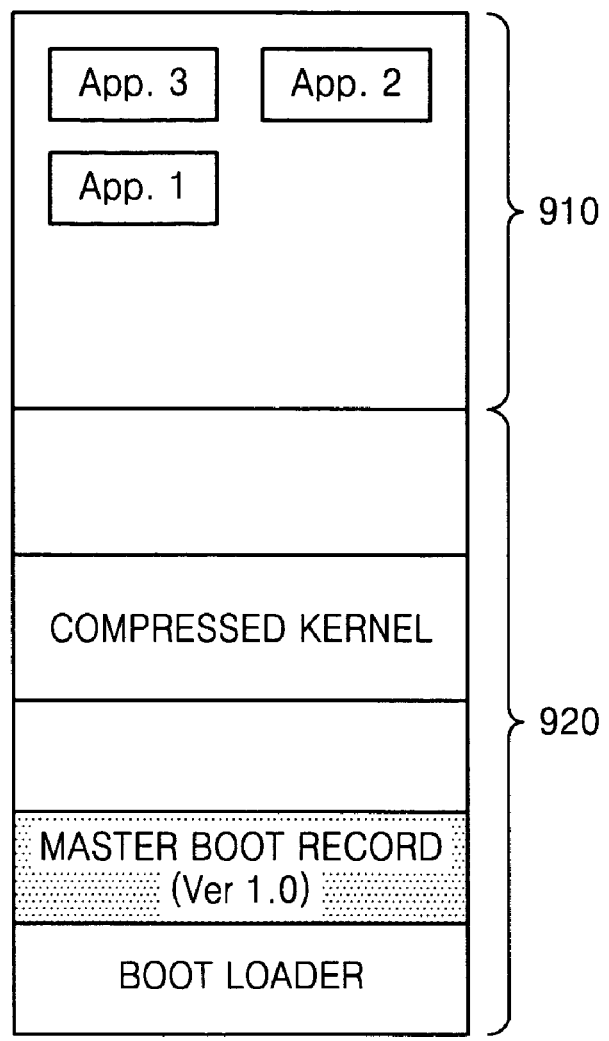
FIGS. 10A, 10B, 10C, and 10D illustrate memory state changes during the components automatic update of an update package according to an exemplary embodiment of the present invention.
Figure 10A:
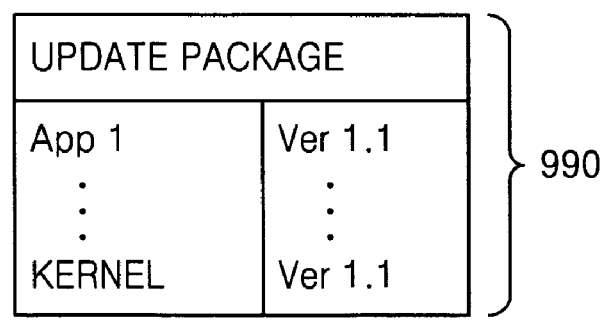

Referring to FIG. 10A, the update package 990 is a list of software components to be updated. The list may include application components and a kernel. It may be possible to sequentially update the application components (S102 through S109) and then update the kernel that is a critical component.

Figure 10B:
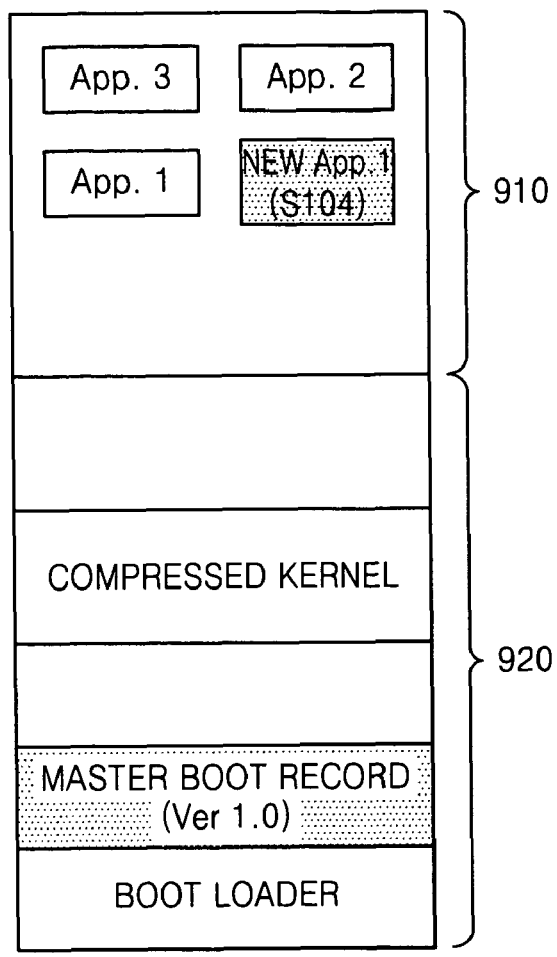
Figure 10C:
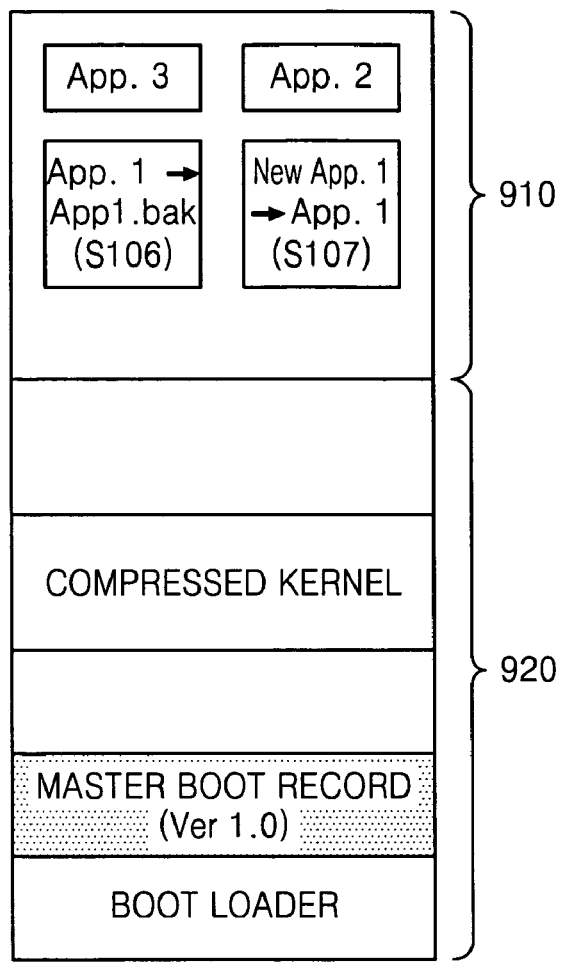
Figure 10D:
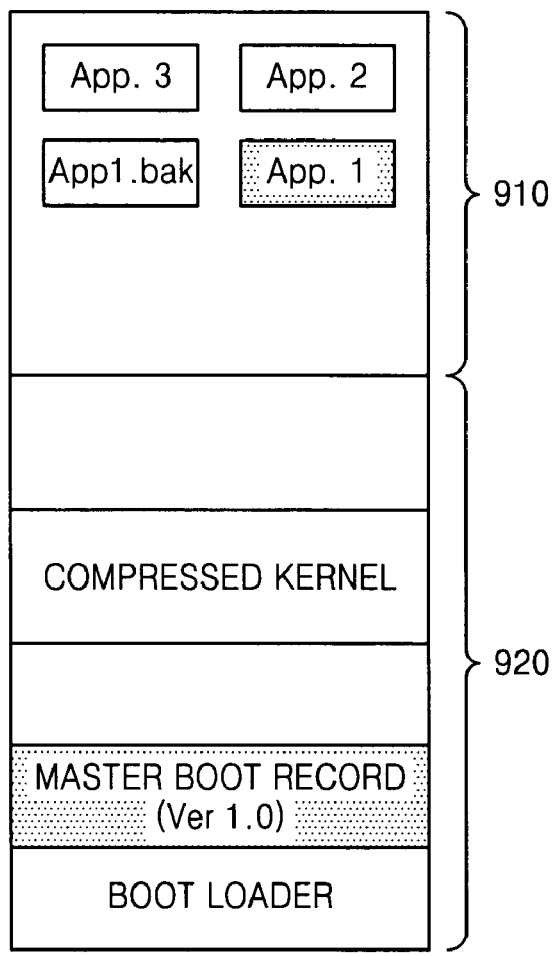

An application component other than the kernel, i.e., an application App. 1 included in the update package 990, is updated as illustrated in FIGS. 10B, 10C, and 10D. The application App. 1 is updated by changing previous component information to current component information, downloading components of a new version, and changing the current component information to information on the new version component.

Referring to FIG. 10B, PACKAGECOMMIT 940 is set as "NO" to start an update transaction (Operation S101). The current component state information 970 is changed to "DOWNLOAD" (Operation S102), the previous component information 980 is changed to the current component information 960 (Operation S103), and a component, i.e., a new APP. 1, of a new version is downloaded and stored (Operation S104).

Referring to FIG. 10C, the component state information 970 is changed to "UPDATE" (Operation S105), the component APP. 1 of a previous version is backed up as Appl.bak (Operation S106), and the component, i.e., the new APP. 1, of the new version is changed to the original component App. 1 (Operation S107).

Referring to FIG. 10D, the current component information 960 is changed to information on the component of the new version (Operation S108), and the component state information 970 is changed to "DONE" (Operation S109). The current and previous versions of the component App.1 are 1.1 and 1.0, respectively.

Each of the applications included in the update package 990 is updated through Operations S102 through S109. The kernel is finally updated through Operations S92 through S98 illustrated in FIGS. 9A, 9B, and 9C. When every component included in the update package 990 is completely updated, PACKAGECOMMIT 940 is set as "YES" to finish the update transaction (Operation S120).

When an error occurs in the component update, the components can be automatically recovered to the previous version by determining whether components included in the update package are successfully updated, and, if it is determined that the component update is stopped, changing backup components corresponding to all the components included in the update package to original components. When an error occurs in the kernel update, the kernel can be automatically recovered to the previous version by copying the backup boot record 923 to the master boot record 922.

Whether the update error occurs is determined based on state information on the update transaction. If the update transaction is in a state that indicates a start when the system is rebooted, it is determined the update transaction was unsuccessfully stopped before being rebooted. However, although the update transaction is not finished, if the state information on the components included in the update package 990 other than the kernel is set as "DONE", and the current kernel information and the kernel information stored in the master boot record 922 are identical to each other, the kernel update is actually finished. Therefore, it is regarded that the kernel update is successfully finished, the kernel may not be recovered to the previous version and the update transaction is committed.

Figure 11:
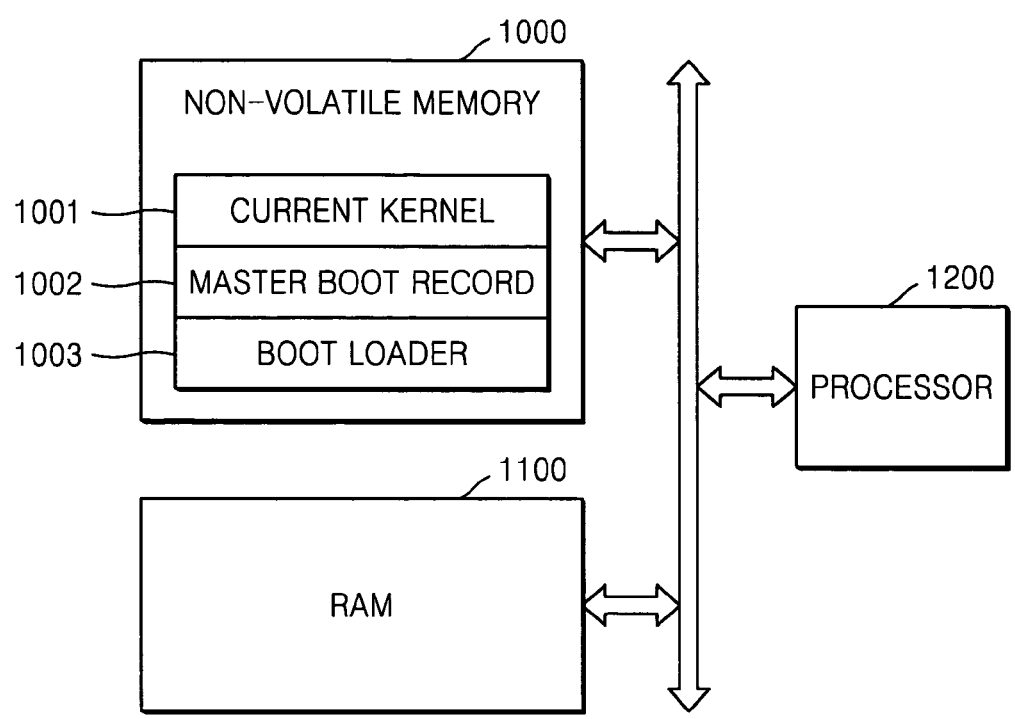
FIG. 11 is a block diagram of a system for updating software and recovering from an update error according to an exemplary embodiment of the present invention.

FIG. 11 is a block diagram of a system for updating software and recovering from an update error according to an exemplary embodiment of the present invention. Referring to FIG. 11, the system comprises a processor 1200, a RAM 1100, and a non-volatile memory 1000 that stores a current kernel 1001, a master boot record 1002 including address information on the current kernel 1001, and a boot loader 1003 that is a program code (e.g., a set of instructions) for booting the system.

The boot loader 1003 loads the current kernel 1001 to the RAM 1100 and executes the RAM 1100 using the master boot record 1002 to boot the system. The master boot record 1002 may include a validity flag indicating whether the current kernel 1001 is valid.

Figure 12:
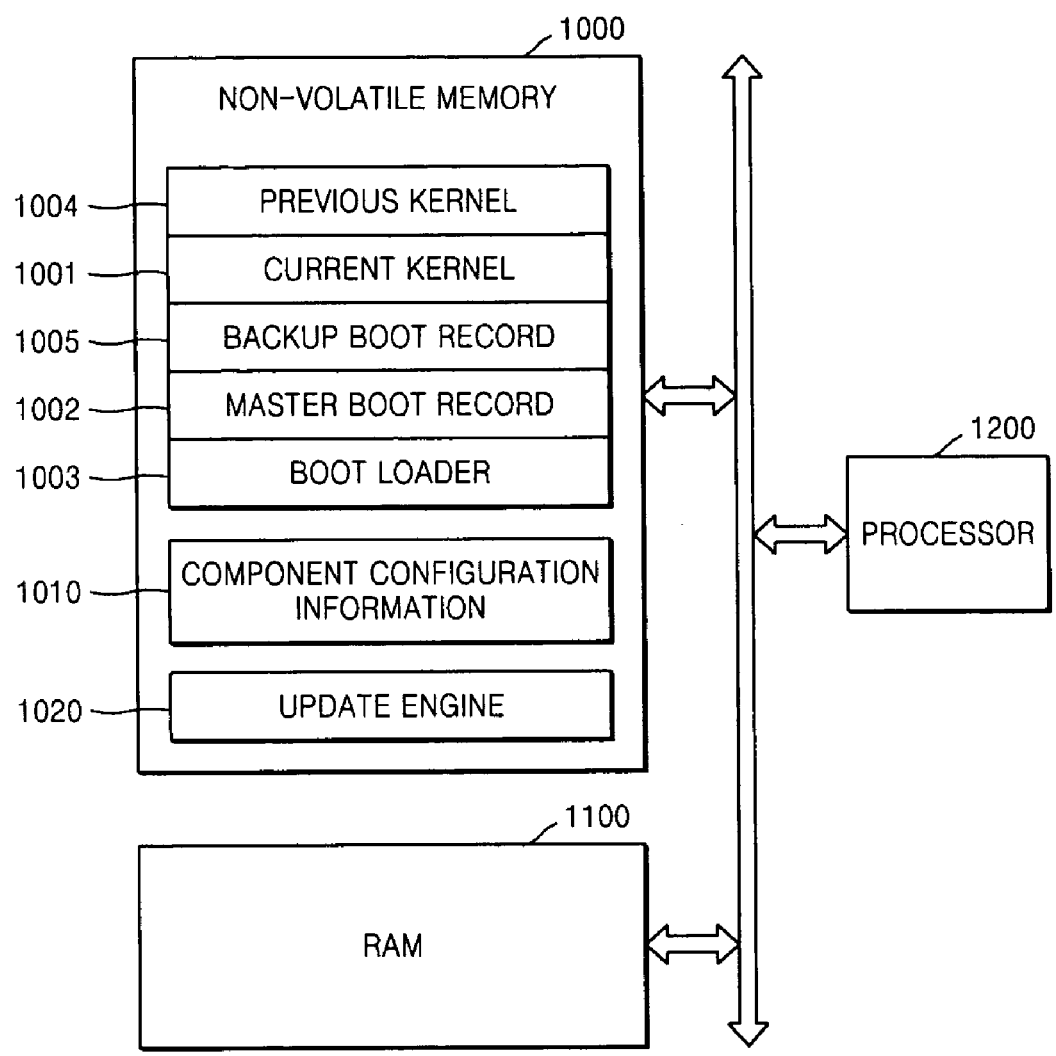
FIG. 12 is a block diagram of a system for updating software and recovering from an update error according to another exemplary embodiment of the present invention.

FIG. 12 is a block diagram of a system for updating software and recovering from an update error according to another exemplary embodiment of the present invention. The non-volatile memory 1000 may include a previous kernel 1004 of a previous version that is a backup kernel, and a backup boot record 1005 that is a backup master boot record 1002. In this case, when the system is booted, the boot loader 1003 determines whether the master boot record 1002 is valid. If it is determined that the master boot record 1002 is valid, the current kernel 1001 is loaded using information on the master boot record 1002, and if it is determined that the master boot record 1002 is not valid, the previous kernel 1004 is loaded using information on the backup boot record 1005.

The non-volatile memory 1000 may include component configuration information 1010 including information on a software update, and an update engine 1020 that updates software components and recovers from an error that occurs in the components update using the component configuration information 1010.

The component configuration information 1010 may include state information on an update transaction, previous information including names, addresses, and version of components which were installed before they are updated, current information including addresses and version of updated components, and update state information on the components, as illustrated in FIG. 4B. The update engine 1020 updates each of the components and recovers from the update error based on the component configuration information 1010.

The exemplary embodiments can also be embodied as computer readable code (e.g., a set of instructions) on a computer readable medium.

As described above, the exemplary embodiment can update software and a kernel that may cause a fatal result when its' update fails at that time, and can recover a system from an update error using component configuration information.

Also, even if the software update is stopped for an external reason, the exemplary embodiment recovers a system in a booting unit using final configuration information that is successfully loaded, thereby substantially perfectly rolling back the system to a previous version.

Also, the exemplary embodiment effectively update kernel and boot the system using boot records, and substantially improves a system operating speed by changing only the boot records when the kernel is recovered.

While this invention has been particularly shown and described with reference to exemplary, non-limiting embodiments thereof, it will be understood by those skilled in the art that various changes in form and details may be made therein without departing from the spirit and scope of the invention as defined by the appended claims.

What is claimed is:

1. A method for automatically updating software and recovering from an update error, the method comprising:
   executing a boot loader stored in a non-volatile memory, the non-volatile memory storing a current kernel, a master boot record including address information on the current kernel and a validity flag indicating whether the current kernel is valid, the boot loader that loads the current kernel to a random access memory (RAM) and executes the current kernel using the master boot record to boot a system, a previous kernel, and a backup boot record that includes address information on the previous kernel;
   determining whether the master boot record is valid based on the validity flag;
   if it is determined that the master boot record is valid, loading by the boot loader, the current kernel using the information on master boot record; and
   if it is determined that the master boot record is not valid, loading the previous kernel using the information on the backup boot record.

2. The method of claim 1, further comprising:
   determining a result of a previous update based on component configuration information including information on an update of software components installed in the system;
   if it is determined that the previous update was successfully finished, loading and executing the components based on current component information included in the component configuration information; and
   if it is determined that the previous update was not successfully finished, loading and executing the components based on the previous component information included in the component configuration information.

3. The method of claim 2, further comprising:
   when the previous update was stopped, if it is determined that the update of software components other than the current kernel was completed, and current kernel information included in the component configuration information and kernel information stored in the master boot record are substantially identical to each other, loading and executing the components based on the current component information included in the component configuration information.

4. A non-transitory computer readable medium having embodied thereon a computer program for executing a method for automatically updating software and recovering from an update error, the method comprising:
   executing a boot loader stored in a non-volatile memory, the non-volatile memory storing a current kernel, a master boot record including address information on the current kernel and a validity flag indicating whether the current kernel is valid, the boot loader loads the current kernel to a random access memory (RAM) and executes the current kernel using the master boot record to boot a system, a previous kernel, and a backup boot record that includes address information on the previous kernel;
   determining whether the master boot record is valid based on the validity flag;
   if it is determined that the master boot record is valid, loading by the boot loader, the current kernel using the information on the master boot record; and
   if it is determined that the master boot record is not valid, loading the previous kernel using the information on the backup boot record.

5. A system for automatically updating software and recovering from an update error, the system comprising:
   a non-volatile memory storing a current kernel, a master boot record including address information on the current kernel, and a boot loader that loads the current kernel to a random access memory (RAM) and executes the current kernel using the master boot record to boot the system; and a processor executing the boot loader stored in the non-volatile memory, wherein the master boot record further comprises a validity flag indicating whether the current kernel is valid, the non-volatile memory further comprises a previous kernel and a backup boot record that includes address information on the previous kernel, and if it is determined that the master boot record is valid, the boot loader loads the current kernel using the information on the master boot record, and if it is determined that the master boot record is not valid, loading the previous kernel using the information on the backup boot record.

6. The system of claim 5, wherein the non-volatile memory further comprises component configuration information that includes information on a software update, and an update engine that updates software components and recovers from an error that occurred in the components update using the component configuration information.

7. The system of claim 6, wherein the component configuration information includes at least one of state information on an update transaction, previous information including names, addresses, and version of previous components, current information including addresses and version of current components, and update state information on the components, and the update engine updates each of the components and recovers from the update error based on the component configuration information.

8. The system of claim 5, wherein the master boot record and the backup boot record further comprise information on a kernel identifier and a version.

* * * * *